Figure 1:
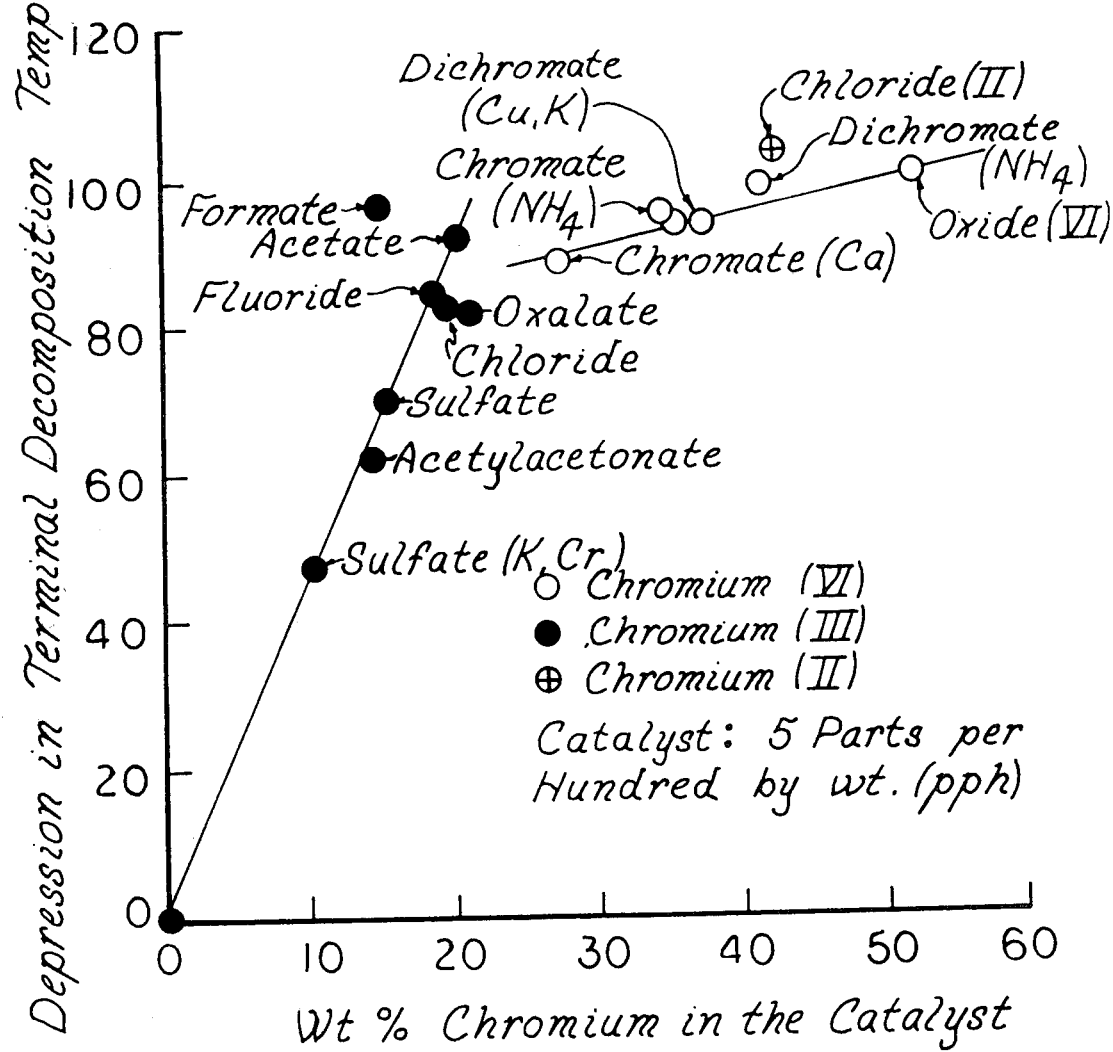
Figure 2:
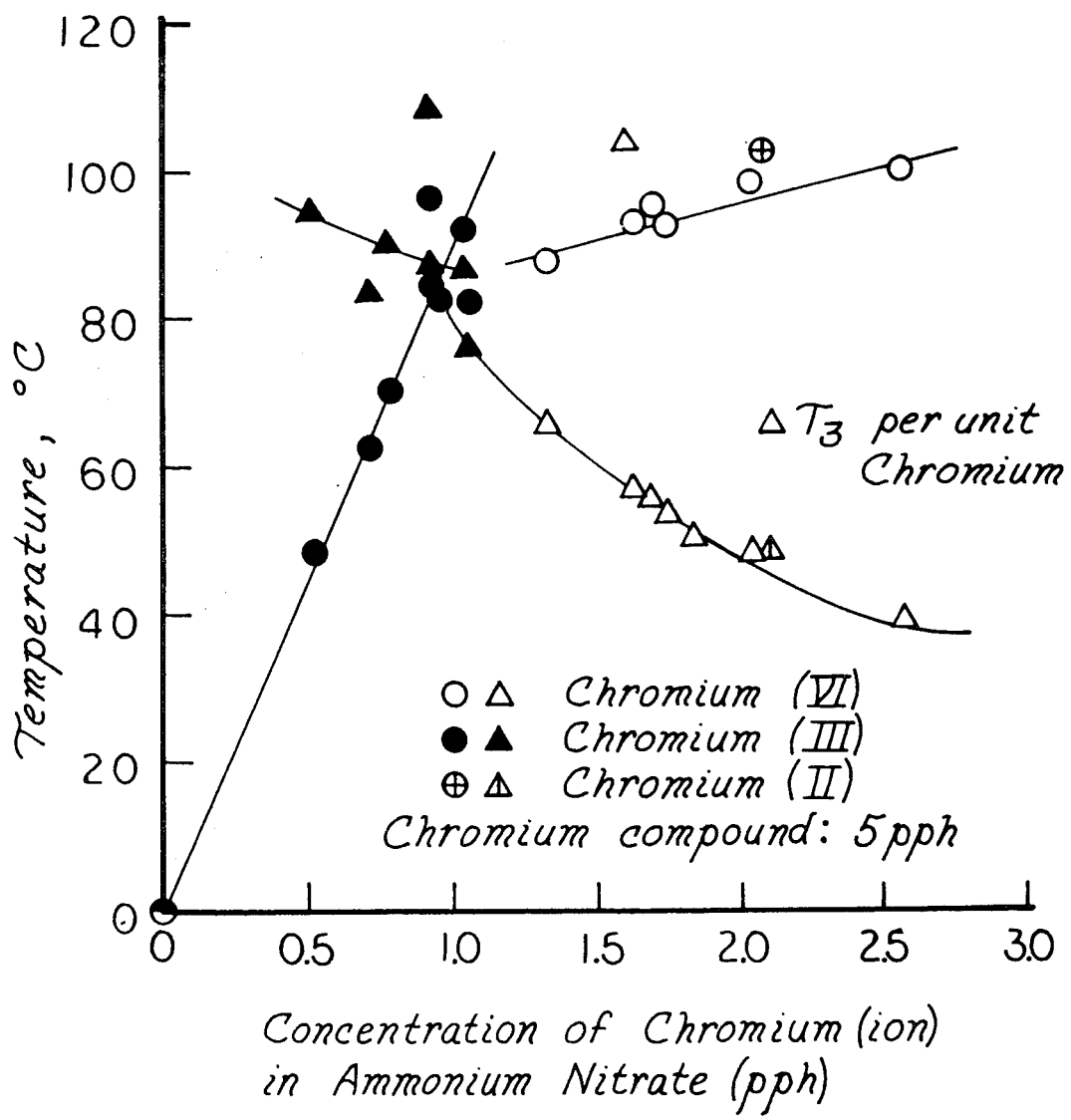
Figure 3:
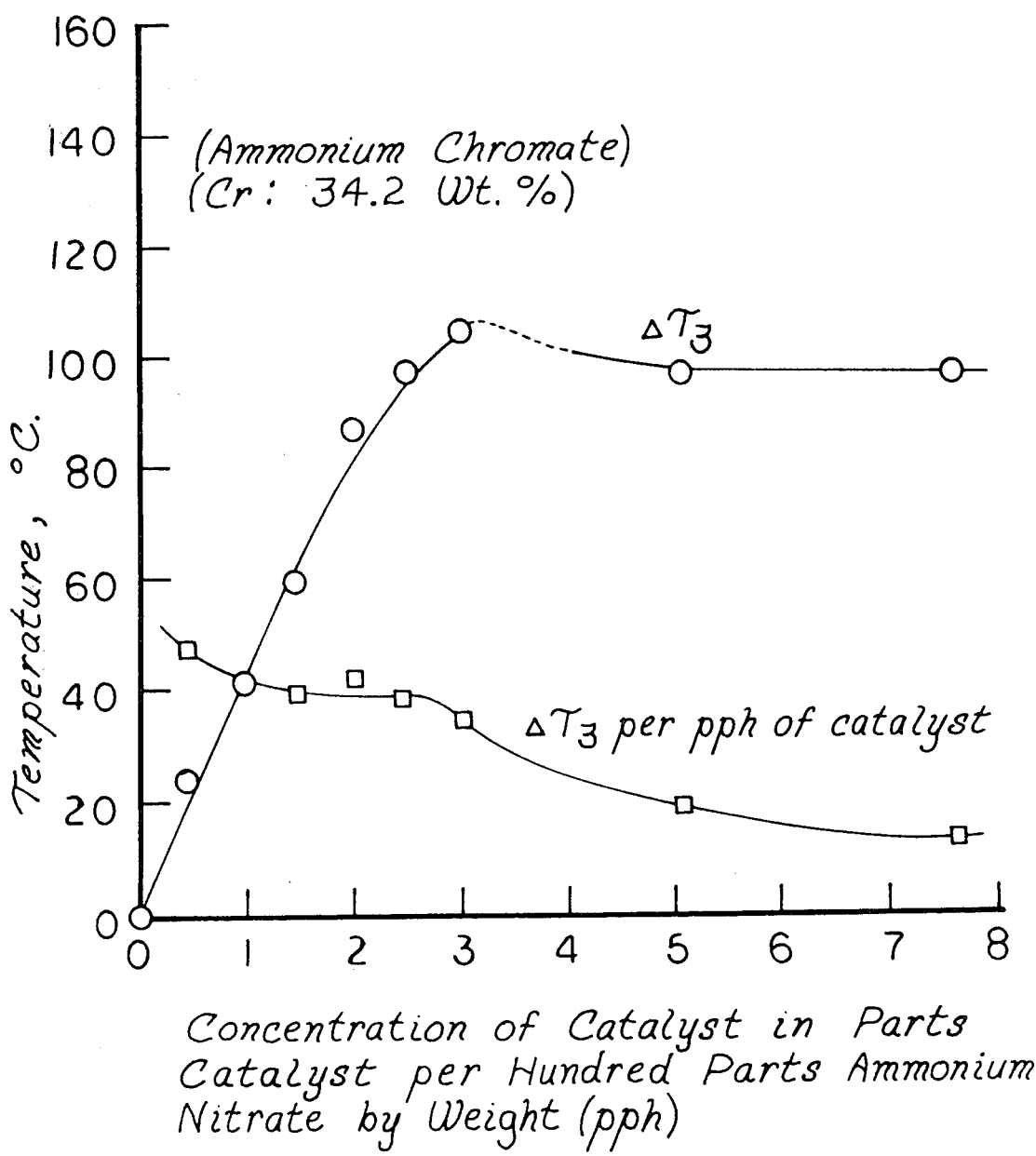
Figure 4:
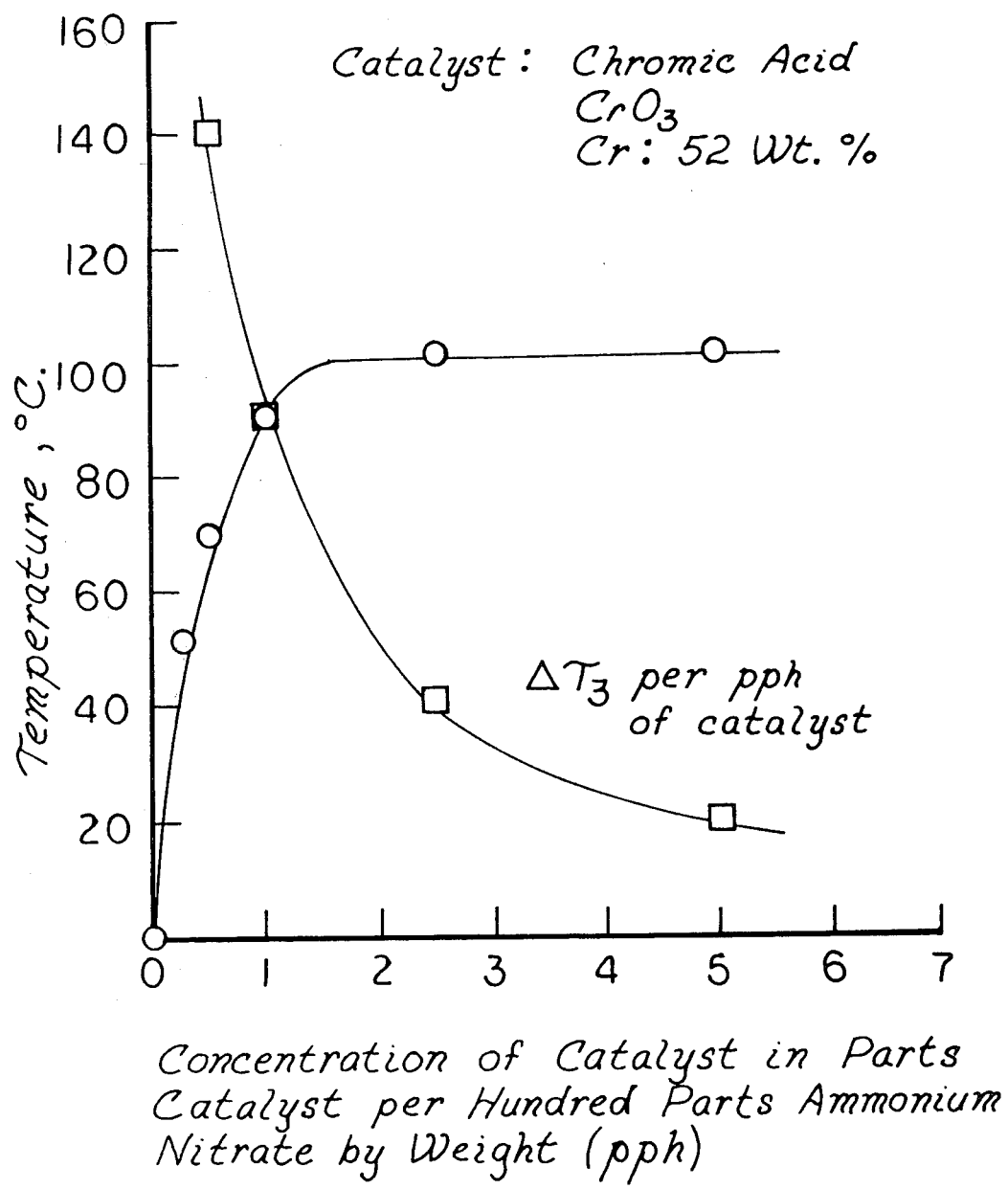
Figure 5:
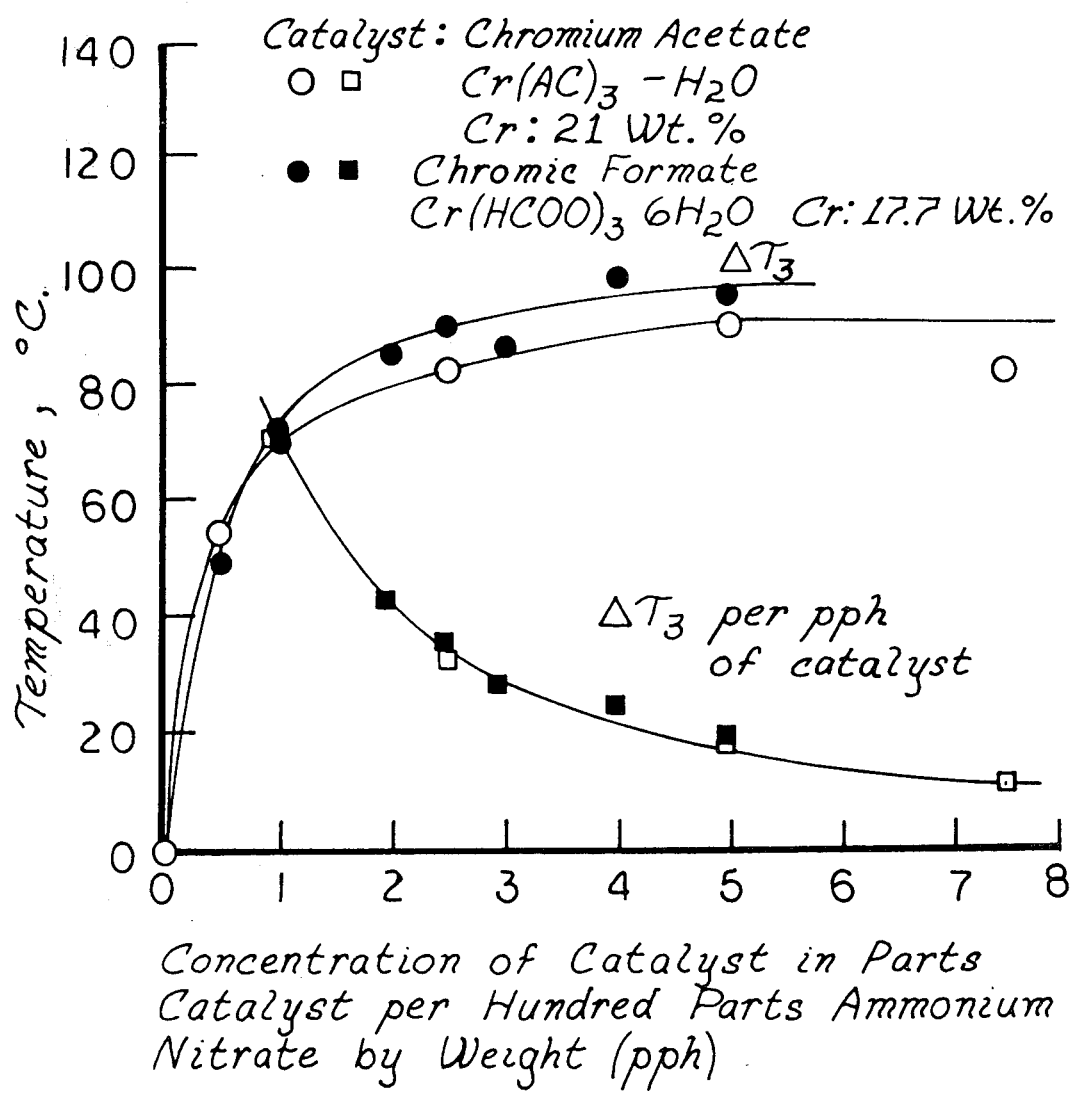
Figure 6:
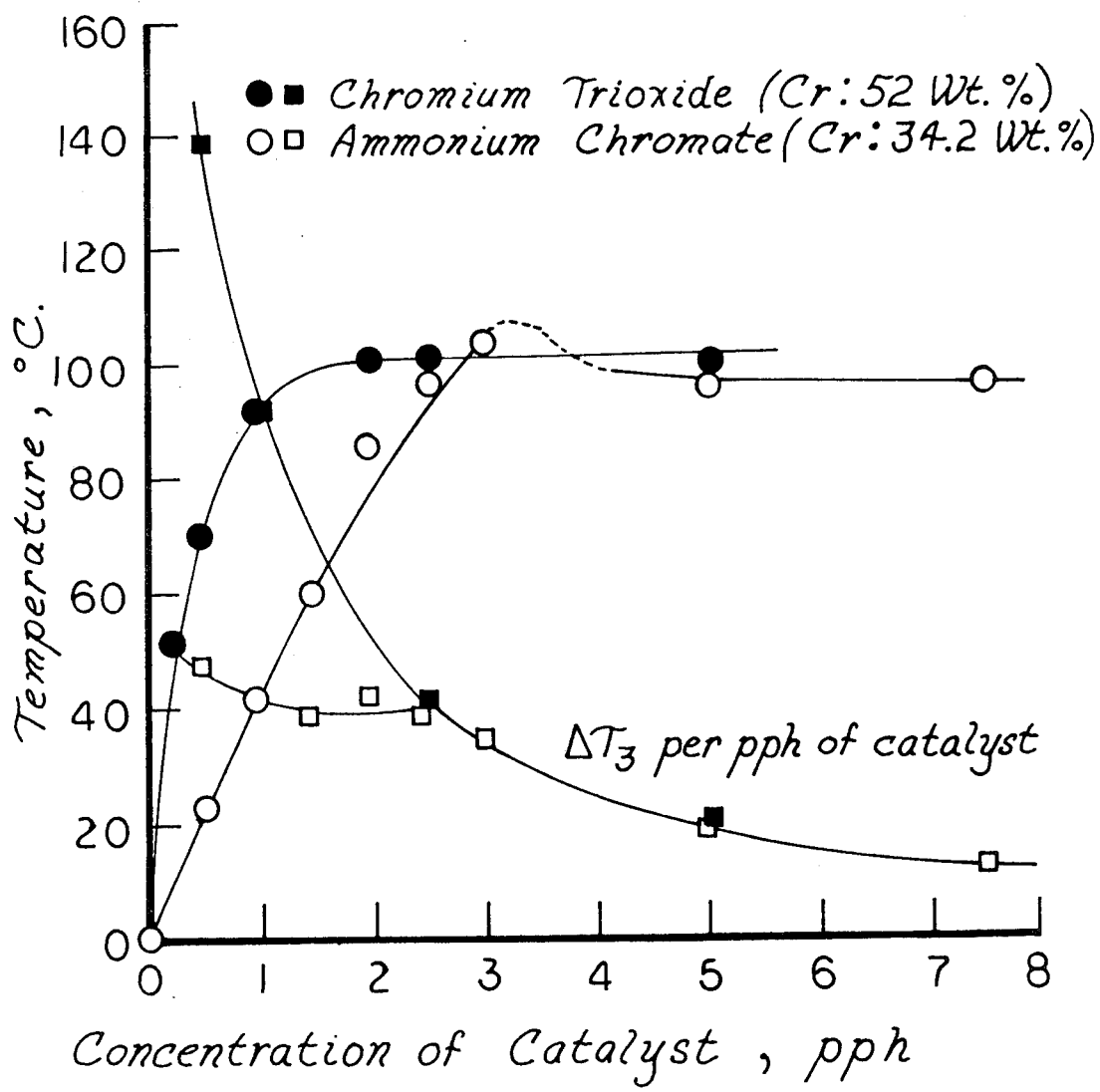
Figure 7:
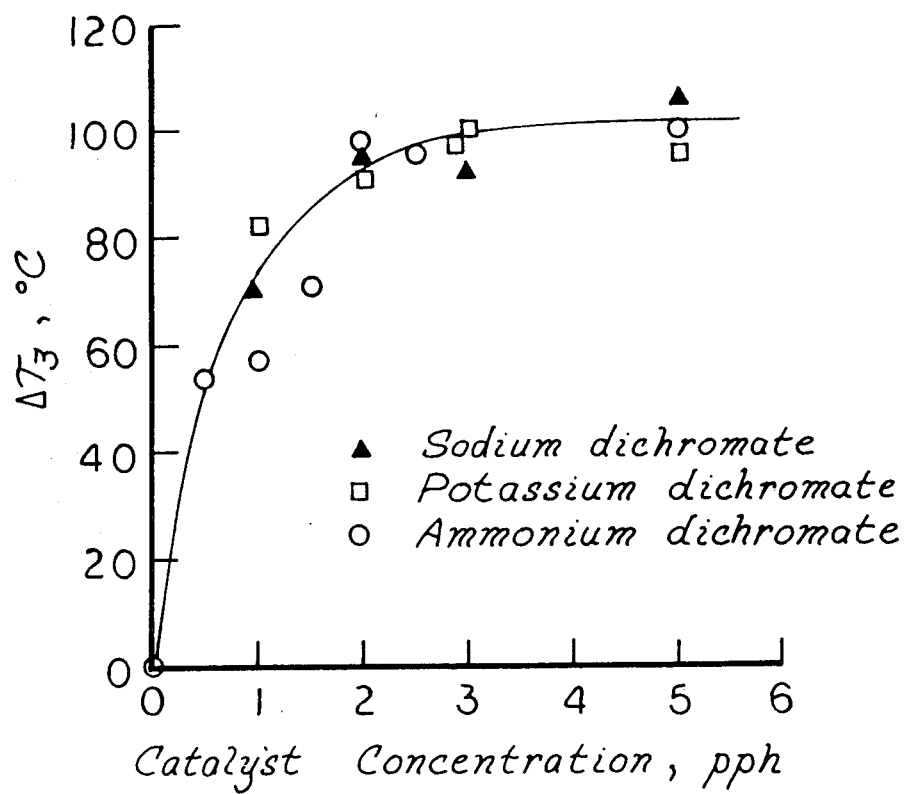
Figure 8:
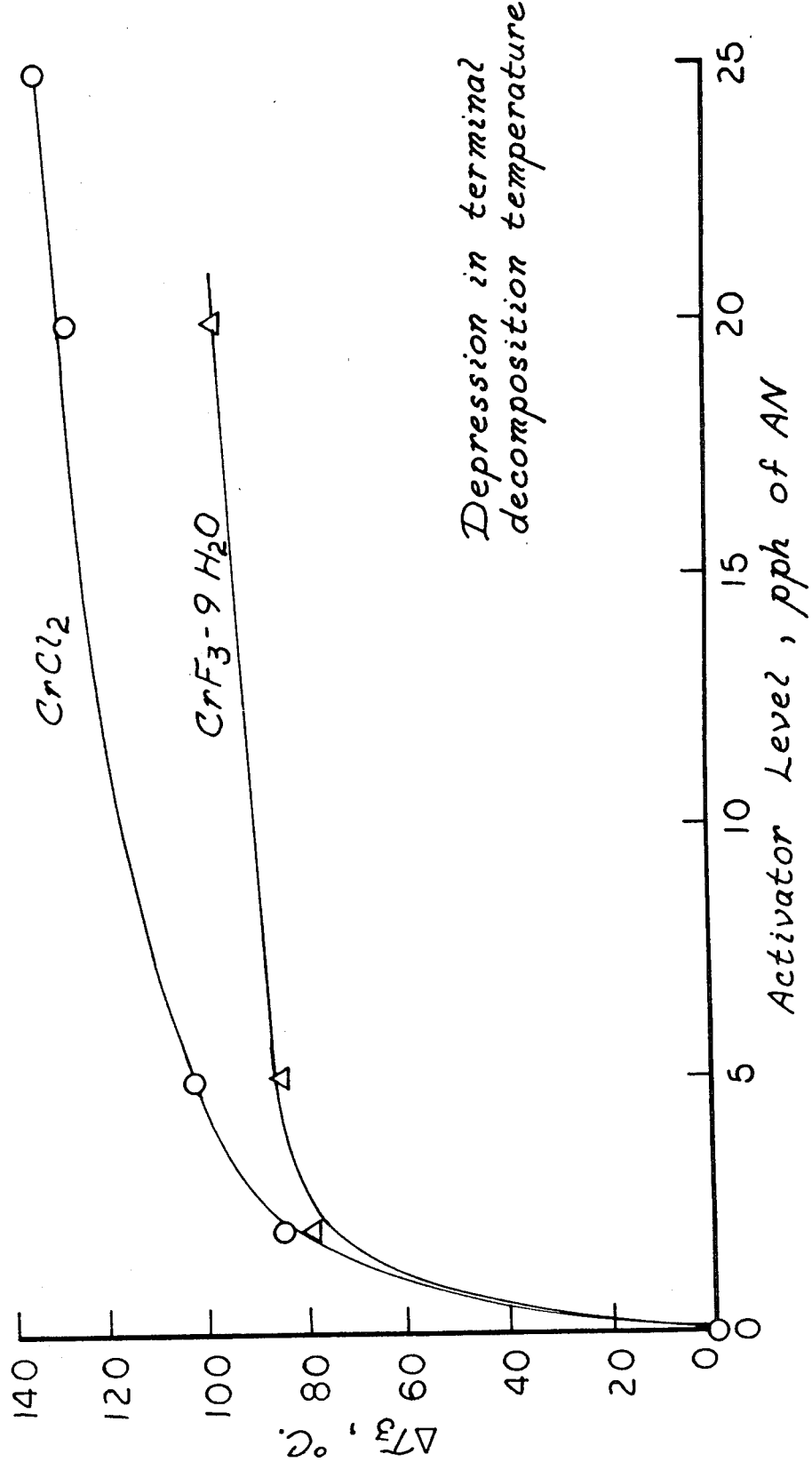
Figure 9:
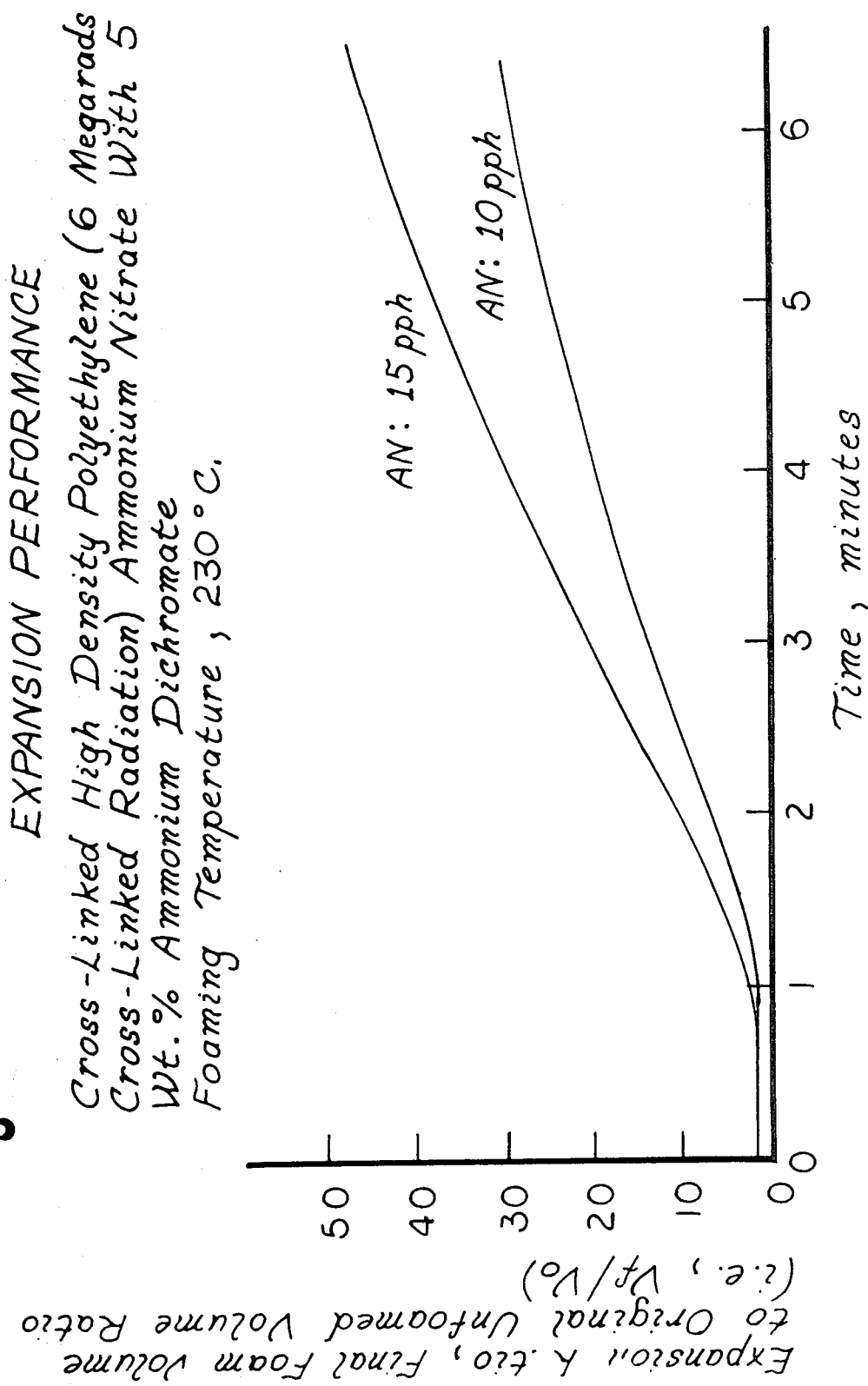
Figure 10:
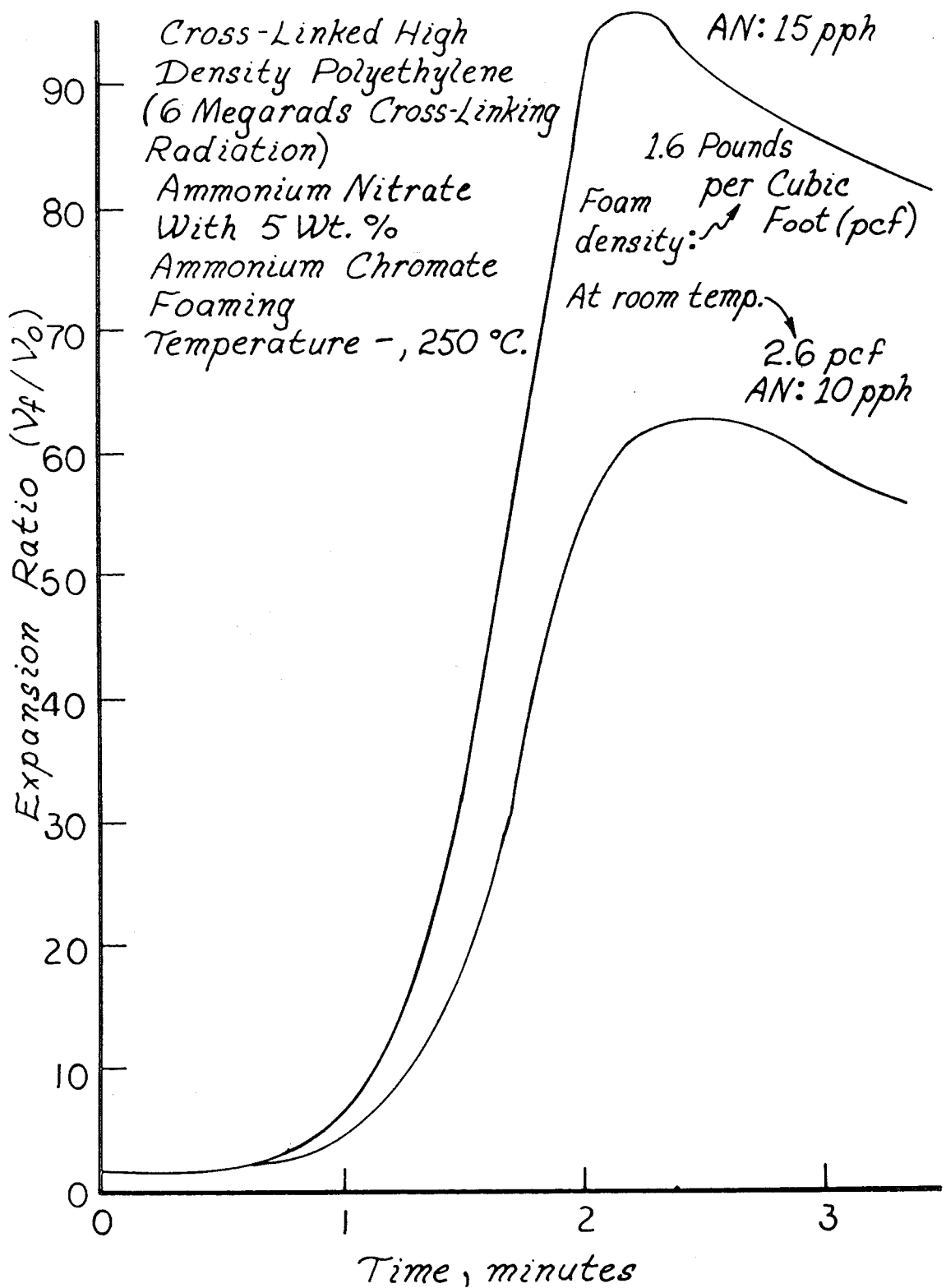
Figure 11:
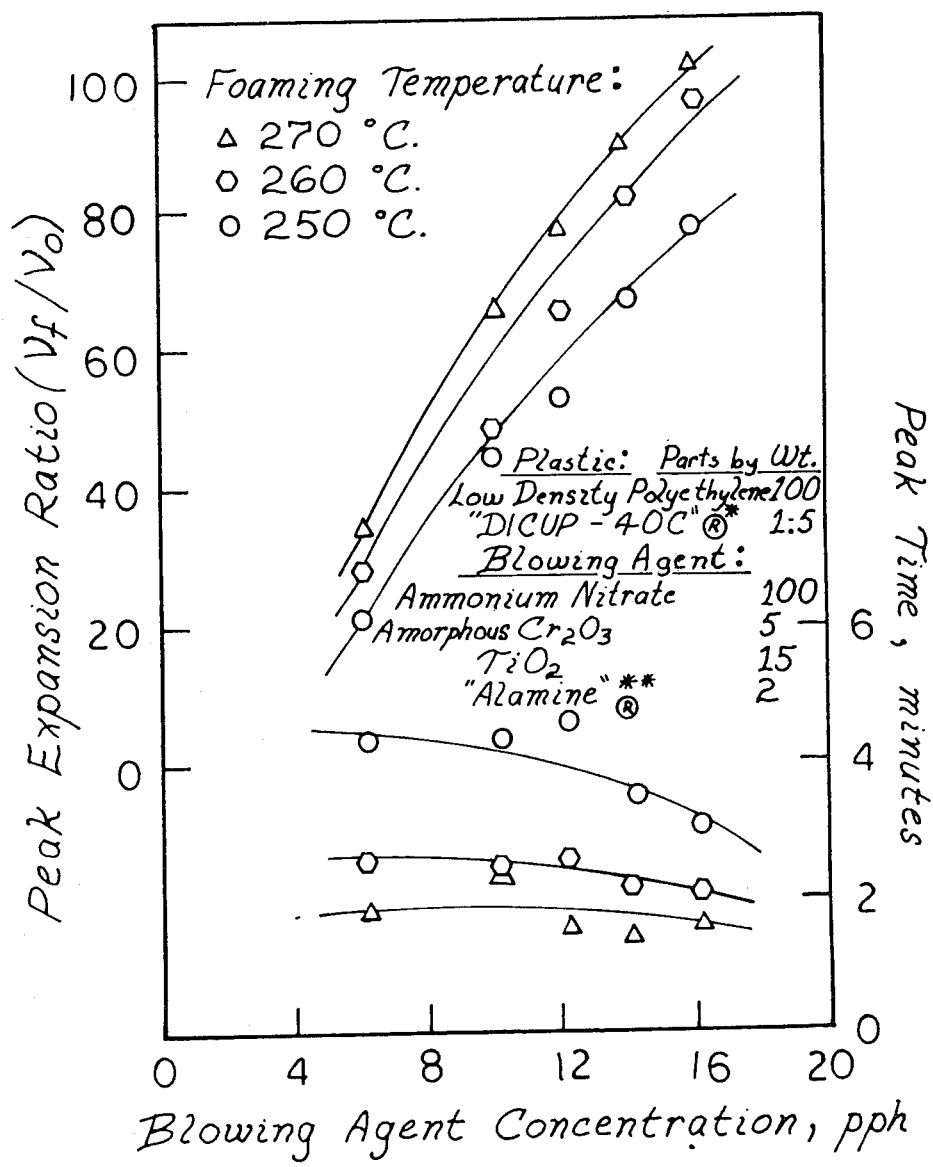
Figure 12:
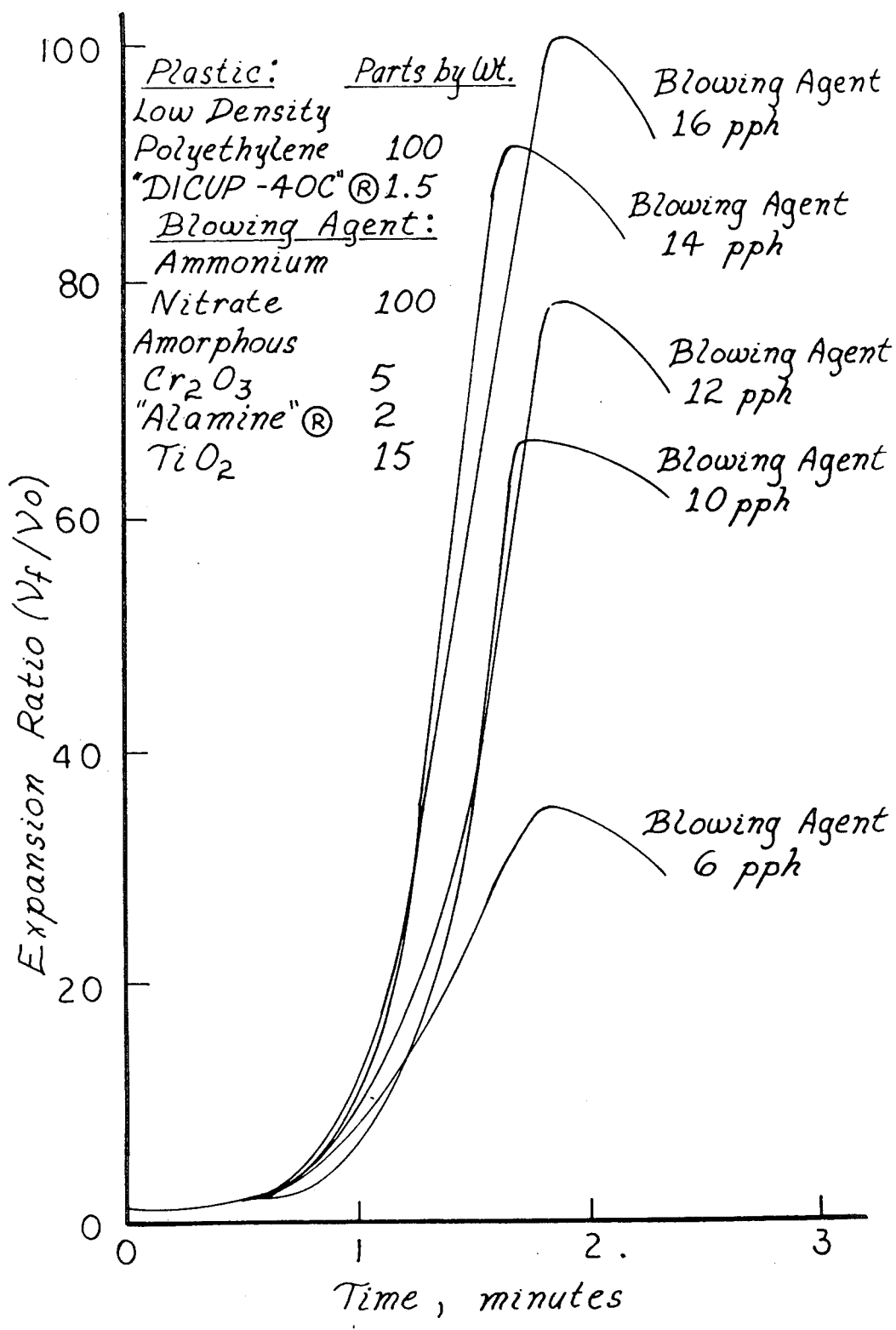

United States Patent [19]

Allada

[11] 4,394,288

[45] Jul. 19, 1983

[54] ACTIVATED AMMONIUM NITRATE PLASTIC FOAM BLOWING AGENT

[75] Inventor: Sambasiva R. Allada, Midland, Mich.

[73] Assignee: The Dow Chemical Company, Midland, Mich.

[21] Appl. No.: 351,849

[22] Filed: Feb. 25, 1982

Related U.S. Application Data

[62] Division of Ser. No. 251,618, Apr. 6, 1981, abandoned.

[51] Int. Cl.³ .............................................. C09K 3/00
[52] U.S. Cl. ............................. 252/350; 264/DIG. 5; 521/92; 521/95; 521/909
[58] Field of Search ............................ 521/92, 95, 909; 252/350

[56] References Cited

FOREIGN PATENT DOCUMENTS 824183 11/1959 United Kingdom ................ 252/350

Primary Examiner—Morton Foelak
Attorney, Agent, or Firm—R. B. Ingraham

[57] ABSTRACT

Ammonium nitrate activated or catalyzed with certain chromium compounds provides an excellent, low cost blowing or expanding agent(s) for many foamable polymers, including polyethylene(s), polystyrene(s), etc.

4 Claims, 12 Drawing Figures

EFFECT OF CONCENTRATION ON CATALYTIC ACTIVITY - of Cr (VI)

Effect of Temperature and Blowing Agent Level on Peak Expansion – ($Cr_2O_3$ Catalyst)

\* Dicumyl Peroxide
\*\* Distearyl Secondary Amine

Degree and Rate of Expansion of Foams with Ammonium Nitrate Blowing at High Temperature (270°C)

ACTIVATED AMMONIUM NITRATE PLASTIC FOAM BLOWING AGENT

CROSS-REFERENCE TO RELATED APPLICATION

This is a divisional of application Ser. No. 251,618, filed Apr. 6, 1981, now abandoned.

BACKGROUND OF THE INVENTION

Conventional and widely-employed blowing agents for expanded plastic(s) production are either organic materials, such as azodicarbonamide and the like or equivalent, which are inherently relatively costly and-/or fluorocarbon and the like or equivalent physical blowing agent materials which are suspect as being environmentally deleterious.

Ammonium nitrate ($NH_4NO_3$) is known to be thermally decomposable into gaseous products; but its action is sluggish and, per se, unsuited and dissatisfactory for direct, straightforward use as a blowing agent for the manufacture of plastic foam or expanded products.

Nothing in prior art appears to realistically concern itself with nor teach or lead to an effective, efficient and extremely reliable means and technique for utilizing ammonium nitrate as a blowing agent in and for plastics compositions in the manner of composition and beneficial functionality and operability following the way so crucially indigenous as in the present contribution to the art.

FIELD AND PURVIEW OF THE INVENTION

The present invention, and the principle aims and objectives attainable thereby, pertain(s) and direct(s) to a novel and, in the overall, unprecedented activated ammonium nitrate blowing agent for plastic foam production, which is of a low-cost, thermosensitive, chemical nature and well adapted for the manufacture of large-volume, thermoplastic foamed or expanded products, that is additionally characterizable in having features of rapid, controllable decomposition (i.e., functional in a relatively narrow temperature range), large yield(s) of foam-producing gases when thermally decomposed, exothermic on a moderate to large scale as an intrinsic behavioral pattern upon decomposition and otherwise exceptionally advantageous and desirable.

The achievement and provision of all indicated, with even more and additionally other benefits and advantages derivable from and in present practice, appear and become more evident in the ensuing description and Specification.

SUMMARY OF THE INVENTION

The present invention, in its genesis and as derives from the discovery on which it is based, pertains to the indicated novel activated ammonium nitrate blowing agent means (and associated procedures) comprising: alone and also in and for an expandable, resinous thermoplastic material mass and as a thermosensitive blowing agent therefor and in intimate combination therewith—an effective, minor proportion relative to the quantity of said thermoplastic material with which it is combined capable, upon exposure to heat at an elevated temperature below the thermal degradation point of said thermoplastic material, of thermal decomposition so as to release foam-producing gases for said incorporating thermoplastic material of ammonium nitrate is pulverulent form containing as an activating and gas-releasing catalytic ingredient therewith a relatively effective amount of a chromium compound selected from the group consisting of inorganic and organic salts of chromium; oxides of chromium excepting the crystalline sesquioxide but including amorphous forms thereof; and mixtures of same.

Method usage and foam or expanded product obtention, as implied, of the contemplated composition is also here contemplated and intended as an integral part of the invention.

Still other features and implementations of beneficial import and salience are advantageously combinable in and made integral features of the basic and above-delineated novel blowing agent system of the invention.

Thus, various suitable ingredients, overall compositions plus other adaptations and techniques for utilization, as well as working details, embodimental instructions and parameters and other specifics of the invention are also set forth in the following Specification.

In this connection, the basic principles and limitations of: foamable and expandable thermoplastics; blowing agents and other gas-liberating and/or -providing materials for producing foamed plastics products; ammonium nitrate composition and chemistry; ball milling and the like or equivalent pulverizing techniques; composition and chemistry plus behavior of variuos compounds and substances of chromium; compounds and handling techniques for foamable thermoplastic compositions including apparatus and equipment necessities therefor as well as the nomenclature and terminologies associated therewith; usages for foam-providing thermoplastic compositions and expanded products thereof; and so forth are so widely comprehended by those skilled in the art that greatly detailed elaboration of all the basics and fundamentals thereof and known developments thereon is not herein made or attempted—the same being unnecessary for thorough understanding and recognition of the advance possibilitated for achievement and realization by and with the development in and of efficient means for usage of the activated ammonium nitrate blowing agent systems that are according to and in keeping with the present invention.

PARTICULARIZED DESCRIPTION OF THE INVENTION

Practice of the present invention in basic essence and substance involves use and implementation of the following materials and procedures:

(A) The main ingredient of the blowing agent is common ammonium nitrate ($NH_4NO_3$). This may be a reagent of analytical grade, but more advantageously and economically is a commercial product, such as "Aeroprills" (Reg. TM) Brand from American Cyanamid Company.

(B) The chromium compound activator or catalyst for facilitating thermal decomposition of the ammonium nitrate is, as mentioned, any of a large number of organic or inorganic salts of chromium and/or amorphous oxides thereof in which the valence state of the chromium is Cr(II), Cr(III) or Cr(VI), or mixtures thereof. This includes: ammonium chromate ($NH_4CrO_4$); ammonium dichromate (($NH_4)_2Cr_2O_7$); chromic formate ($Cr(HCOO)_3$); chromium acetate ($Cr(CH_3COO)_3$); the dichromates of sodium or potassium ($Na_2Cr_2O_7$ or $K_2Cr_2O_7$); chromous halides, including the fluoride ($CrF_2$), chloride ($CrCl_2$) and bromide ($CrBr_2$); as well as various chromates and dichromates of other metals, chromium butyrate, chromium acetylacetonate and chromium salts of other organic acids plus a number of other Cr(II) salts; and also chromium trioxide (CrO₃), also known as chromic acid anhydride) and, advantageously amorphous chromic sesquioxide ($Cr_2O_3$). Surprisingly, crystalline forms of $Cr_2O_3$ exhibit little, if any, discernible catalytic effect on the ammonium nitrate.

In this connection, it is frequently desirable to utilize Cr(III) compounds as the activating materials since they generaly display minimized characteristics of toxicity. Along this line, it is known that Cr(VI) substances tend to be dangerous in toxicological (including highly suspected carcinogenic) effects. Thus, due care should be taken in their application in practice of the invention to avoid unpleasant consequences of such usage in instances where any such risk or exposure is better avoided.

As indicated, the amorphous form of chromium sesquioxide is very desirable for utilization in practice of the invention. This is for reasons that: (i) it is substantially water-insoluble (having a typical aqueous solubility of something only on the order of 2-3 parts per million by weight (i.e., "ppm") under relatively normal conditions of temperature and pressure); and (ii) it has an attractive and readily-tolerable, very low toxicity characteristic.

Relevant to the immediate foregoing, it has been found that the best quality chromium sesquioxide for utilization in practice of the present invention is that prepared at processing temperatures (including drying procedures) that do not exceed 110° C., preferably those that are not in excess of 105° C. However, when the chromium sesquioxide material is made and processed under a blanket of nitrogen or other inert gas so as to be at least relatively oxygen-free, temperatures up to (but generally not exceeding) 150° C. may be utilized; although it is advantageous even then to keep the temperature below about 115° C. When an $N_2$ or equivalent inert gas blanket is employed over the reaction mass in the temperature-controlled preparation of amorphous $Cr_2O_3$, it is particularly beneficial to operate the involved system under relatively high vacuum conditions (such as those about 28-29 inches—roughly 710-740 millimeters—of Hg vacuum). This, of course, usually involves continuous bleeding of the inert gas into the system being maintained at the indicated vacuum levels.

In any event, such controlled temperature and/or blanketing techniques avoids generation of more than literally "vanishing point" quantities of undesirable Cr(VI) components in the thereby-obtained product.

In illustration of this, when the chromium sesquioxide is made without benefit of inert gas blanketing but at temperatures of not more than (and generally below) the critical 105°-110° C., level, the Cr(VI)-materials content in the product is usually not in excess of—and ordinarily much lower than—from only 100-300 ppm. However, when the beneficial inert gas blanketing procedure is employed during processing, the quantity of Cr(VI) component(s) in the chromium sesquioxide product is invariably of a much lower order of magnitude so as to have an at least ten-fold reduction in presence by coming out somewhare in under 10 ppm trace range (usually on the order of only about 3-5 ppm).

If and when the indicated temperature limits of oxygen-free operation are not observed, the Cr(VI) material(s) content in the $Cr_2O_3$ product invariably increases to undesirably high inclusions that are usually at least one-hundred-times (100×) to as much as 1,000× or more than the indicated levels, especially when higher temperatures are involved.

In this connection, the processing temperature parameters given for manufacture of amorphous chromium sesquioxide product relatively free from Cr(VI) constituents are usually of greatest significance only in the final drying phases of the operation. While there is no limitation thereabout, the preliminaries to drying in the processing can ordinarily be done satisfactorily at, with no particular need for utilization at greater levels than, ordinary room temperature or other normal ambient temperatures likely to be encountered.

Amazingly enough, the contemplated chromium compounds for use as catalysts to expedite thermal decomposition of ammonium nitrate as a blowing agent in practice of the invention are unique. For example, the analogous molybdenium, tungsten, vanadium, tantalum and manganese compounds do not work and are inoperable for the same purpose.

It is generally adequate to employ less than about 10 parts of the chromium compound catalyst by weight per hundred parts of the ammonium nitrate (i.e., "pph") in the constitution of the blowing agent ingredient; although greater quantities can be utilized despite the fact that such larger amounts give only diminishing returns to the point of no added value insofar as ammonium nitrate activation is concerned. Beneficially, between about ¼ and about 5 pph of the chromium compound is included in the activated ammonium nitrate.

(C) Somewhat conventional quantities of the activated ammonium nitrate blowing agent can be utilized in the plastic material to be foamed for effective expansion thereof. Thus, between about ¼ and about 25 percent by weight (i.e., "wt.%") of the activated blowing agent may be compounded with the plastic for foaming purposes; this quantity more often being beneficially on the order of between about 2 and about 15 wt.%, all based on total composition weight. Commonly employed admixing and milling means, including melt blending, can be utilized to incorporate the activated ammonium nitrate blowing agent into the plastic mass to be expanded.

(D) It is most advantageous for the activated ammonium nitrate blowing agent to be made available as a more-or-less "fluffy", free-flowing finely divided powder having an average particle size on the order of between about 4 and about 20 microns (i.e., "$\mu$"); this preferably being in the range of from about 10 to about 15$\mu$ as determined using an optical microscope. This may be readily achieved in any of several convenient ways, including by way or non-limiting illustration: aqueous solution blending of the chromium compound and the ammonium nitrate followed by crushing and wet ball milling; melt blending followed by crushing and ball milling; direct mixing of the pulverized chromium compound and ammonium nitrate constituents followed by ball milling; and so forth. Liquid media, such as perchloroethylene, may oftentimes be utilized with advantage in wet ball milling procedures (the use of same generally requiring that the pulverized blowing agent be dried by evaporation and/or vacuum drying or the like). Screening of the finally interblended activated ammonium nitrate blowing agent can be helpful to avoid lumps or undesirably large particles therein to ensure maintenance of the material in a "micronized", as it were, state.

Of course, smaller particle sizes of the chromium-containing pulverized blowing agent material tend to be "easier to breathe". Thus, the indicated narrower range particle size specifications for same may avoid unwanted respiratory and/or ingestion difficulties on the part of persons necessarily exposed to these materials.

Also in line with the foregoing dissertation on temperature and/or inert gas blanketing control for chromium sesquioxide preparation, the drying process, when one is involved, following the blending operation for mixing in the chromium compound with the ammonium nitrate to make an activated blowing agent composition pursuant to the present invention is generally better done (especially when wet blending procedures are involved) at temperatures under about 110° C., preferably beneath 80° C., in order to avoid undesirable conversions of the involved chromium compound when it is not Cr(VI) in nature to Cr(VI) materials.

(E) It is also frequently desirable to incorporate minor amounts of from, say, $\frac{1}{4}$ to 15 weight percent, based on total activated blowing agent weight, of various anti-caking and surfactant additives. This tends to overcome the normally hydroscopic propensity of the ammonium nitrate to undesirably agglomerate. For the indicated purpose, such materials as tri-p-cresyl phosphate, aluminum stearate, aluminum distearate, distearyl sec. amine and the like and equivalent soaps and surfactants may be employed. Of course, various fillers such as titanium dioxide (TiO$_2$), chalk (CaCO$_3$), inorganic various lead oxides including white lead fumed silica and so forth may be employed in combination with the activated ammonium nitrate blowing agent. In fact, the use of small amounts of titanium dioxide in mixture with the chromium compound and ammonium nitrate often facilitates dispersion of the particles being pulverized in wet ball milling operations. Frequently, various soap and surfactant additive combinations are desirable.

When soaps and/or surfactants are solely utilized, the content of same in the blowing agent composition is usually satisfactory when it is not in excess of about 4 weight percent thereof—usually being adequate on only the $\frac{1}{2}$-2 weight percent, or so, level. When the inorganic fillers are used alone (which is rare) they can be incorporated in amounts within the indicated range (i.e., approximately 5-20%).

Most often and advantageously, however, the soap and/or additament is combined with the inorganic filler additament. In such cases, the inorganic filler (or, in fact, pigment) additament is most beneficially put in at a level of, say, about 5-25 weight percent, better yet about 10-15 weight percent of the total additament mixture, based on total activated ammonium nitrate involved.

(F) Many foamable thermoplastic masses can be advantageously expanded by means of the activated ammonium nitrate blowing agents in accordance with practice of the present invention. Included in these are: various polyolefins such as polymers and copolymers of ethylene and propylene in high or low density versions and in generally linear or cross-linked forms; polystyrene and other polymers and copolymers of various alkenyl aromatic monomers such as styrene/acrylonitrile copolymers and ABS-type resins; vinyl chloride polymers and copolymers; and numerous other thermoplastic resinous materials capable of being expanded into structural foam products, and (without limitation thereto) medium and low density expanded plastic article materials of construction and usage.

ILLUSTRATED AND OTHER EXEMPLIFICATIONS OF THE INVENTION

The twelve (12) Figures of the accompanying Drawing, each of which is intrinsically-self-informational and self-explanatory, are representative of a number of various experiments with various materials illustrating various aspects and demonstrating results of practice in keeping with the present invention.

The following Examples still further illustrate the invention.

EXAMPLE A

To expand a mildly cross-linked low density polyethylene, which had been crosslinked to low level at 6 megarad ionizing radiation intensity (M.I. ~1.5), the following activated ammonium nitrate (i.e., "AN") blowing agent was prepared:

Blowing Agent 250 grams AN
5 pph ammonium chromate activator
300 cc perchloroethylene liquid crushing assistant
0.55 pph on AN of distearyl secondary amine
17 hours of wet ball mill grinding approximately; at least as to bulk of it, in
4-10$\mu$ particle size range and the perchloroethylene removed by evaporation.

The above-particularized, easily-dispersible activated AN blowing agent was, in individual aliquots separately incorporated at respective 10 and 15 pph levels, based on polymer weight, in polyethylene to be expanded. Each compounded sample was then blown at 250° C. The separate samples with the blowing agent were foamed for, respectively, approximately 2.5 minutes and, as to the second of one pair, about 2.25 minutes. The foam density in pounds per cubic foot (i.e., "pcf") of the first sample made was 2.55 pcf with the gas yield from the blowing agent (measured as cc/gm AN) at 260. The second sample foamed with the same blowing agent had a foam density of 1.55 pcf and a gas yield from the blowing agent of 280.

EXAMPLE B

When Example A was repeated excepting to use 4 pph of ammonium dichromate as the activator, analogous excellent results were obtained.

EXAMPLE C

General purpose polystyrene containing flame retardant additives was compounded with activated AN blowing agent preparations and tested for expansion as indicated in the following tabulation:

| Ingredient | Sample I | Sample II |
| --- | --- | --- |
| Polystyrene | 100 parts by weight | 100 parts by weight |
| Activated AN | 0.5 parts by weight | 0.5 parts by weight |
| Activator in AN | 3 weight percent ammonium dichromate | 3 weight percent ammonium dichromate |
| Water proofing agent | None | 5 weight percent aluminum stearate on AN weight, coated in toluene. |

Both of the Samples were melt blended on compounding rolls at 180° C. for 8 minutes; then molded and heated for foaming at 240° C. The expanded Sample I had a foam density of 54.5 pcf and expanded Sample II had a foam density of 47.5 pcf.

When the foregoing experimentations were repeated excepting to employ fire retardant-free polystyrene of the same quality, the respective foam densities obtained were 50 pcf and 42.7 pcf.

The activated ammonium nitrate blowing agent systems of the present invention provide excellent gas yields, ordinarily in the 200–800 cc/gm range (in actual practice, however (and when incorporated in thermoplastic masses to be expanded) the effective gas yield is usually on the order of approximately 250–400 or so, cc/gm. —which, indeed, is very good); with the composition of the blowing gas being predominantly (i.e., at least about 99.9%) non-toxic $H_2O$, $N_2$, $O_2$ and $N_2O$. Their thermosensitivity compares very favorably with that of azodicarbonamide.

It is to be recognized that many modifications can be readily made in practice of the present invention without substantial departation from its apparent and intended spirit and scope as to embodimentation and practice thereof, which is all in pursuance and accordance with what is set forth and delineated in the hereto-appended claims.

What is claimed is:

1. A blowing agent system for foaming expandable resinous thermoplastic material masses, comprising an intimate, generally "fluffy" and finely divided powder composition of:
   (a) ammonium nitrate; and
   (b) up to about 10 parts per hundred by weight, based on total composition weight, of a chromium compound selected from the group consisting of: inorganic and organic salts of chromium; oxides of chromium excepting the crystalline sesquioxide but including amorphous forms thereof; and mixtures of same;
   said composition having an average particle size range on the order of between about ½ and about 50 microns;
   (c) up to about 4 percent by weight, based on total composition weight of a surfactant or soap additament.

2. The composition of claim 1, wherein the average particle size range thereof is between about 10 and about $20\mu$.

3. The composition of claim 1 and including, in addition thereto and combination therewith
   (d) up to about 25 weight percent of an inorganic pigment filler additament.

4. The composition of claim 1 and including, in addition thereto and combination therewith:
   between about ¼ and about 25 weight percent of a mixture of
   (c) a surfactant or soap additament; and
   (d) an inorganic pigment filler additament, wherein said surfactant or soap additament constitutes not more than about one-fifth (1/5th) of the weight of said additaments mixture.

* * * * *